United States Patent [19]
Pyko et al.

[11] Patent Number: 5,421,191
[45] Date of Patent: Jun. 6, 1995

[54] KNOCK SENSOR DIAGNOSTIC SYSTEM

[75] Inventors: Jan S. Pyko, Bloomfield Twp., Oakland County; Martin G. Yagley, Sterling Heights, both of Mich.

[73] Assignee: Chrysler Corporation, Highland Park, Mich.

[21] Appl. No.: 28,108

[22] Filed: Mar. 8, 1993

[51] Int. Cl.⁶ .................................. F02P 5/15
[52] U.S. Cl. ............................. 73/35; 73/1 DV
[58] Field of Search ............... 73/116, 118.1, 35 KS, 73/350, 35 I, 35 P, 35 H, 1 DV, 35; 123/688

[56]          References Cited
          U.S. PATENT DOCUMENTS

| | | | |
|---|---|---|---|
| 3,393,557 | 7/1968 | Brown et al. | 73/35 K |
| 4,255,965 | 3/1981 | Schulz et al. | 73/35 P |
| 4,289,102 | 9/1981 | Katsumata et al. | 73/35 K |
| 4,895,121 | 1/1990 | McCoy et al. | 73/35 K |
| 4,969,440 | 11/1990 | Murakami et al. | 73/35 K |
| 5,070,843 | 12/1991 | Komurasaki | 73/1 DV |
| 5,284,047 | 2/1994 | Brokaw | 73/35 K |

FOREIGN PATENT DOCUMENTS

| | | |
|---|---|---|
| 0148308 | 7/1985 | European Pat. Off. . |
| 0615119 | 9/1994 | European Pat. Off. . |
| 2253487 | 9/1992 | United Kingdom . |

*Primary Examiner*—Robert Raevis
*Attorney, Agent, or Firm*—Mark P. Calcaterra

[57]            ABSTRACT

A knock sensor diagnostic circuit for use in an automobile by using the reciprocal electromechanical properties of resonators.

15 Claims, 3 Drawing Sheets

KNOCK SENSOR DIAGNOSTIC SYSTEM

BACKGROUND OF THE INVENTION

1. Field of the Invention

The present invention relates generally to knock sensor systems and, more specifically, to a knock sensor diagnostic system for an internal combustion engine.

2. Description of the Related Art

Generally, normal combustion in a spark ignition internal combustion engine occurs when part of a fuel mixture is ignited by a spark from an ignition plug and a resulting flame spreads out into the fuel mixture. Knocking occurs in this process when part or all of the uncombusted fuel mixture ignites itself before propagation of the flame. This self ignition is caused by an increase in temperature due to the compression of the fuel mixture. The knocking of the engine causes a rapid increase in pressure in the combustion chamber and the propagation of a pressure wave which result in mechanical vibration in the engine components and overheats the ignition plugs and engine components.

Various kinds of knock sensor systems have been designed to detect vibration sounds, mechanical vibration acceleration, or combustion internal pressure vibrations of an internal combustion engine. The detection of this engine knock is desirable in that engine operating parameters can be adjusted to avoid such a condition.

Now, under federal regulations, the various knock sensor systems must also include a knock sensor diagnostic system. The diagnostic system will be used to test the integrity of the knock sensor system and report any detected problems to the operator.

SUMMARY OF THE INVENTION

It is, therefore, an object of the present invention to provide a system of diagnosing a knock sensor system.

It is another object of the present invention to provide a knock sensor diagnostic system for piezoelectric narrow band knock sensors without any major modifications to existing knock sensor systems.

It is yet another object of the present invention to provide a knock sensor diagnostic circuit which utilizes the reciprocal electromechanical properties of ceramic/piezoelectric resonators.

To achieve the foregoing objects, the present invention is a knock sensor system for detecting knock in an engine. The knock sensor system includes a knock sensor operatively connected to the engine and a knock sensor circuit connected to the knock sensor. The knock sensor system also includes a controller connected to the knock sensor circuit and means for diagnosing the knock sensor circuit to determine if the knock sensor is installed and operating correctly.

One advantage of the knock sensor diagnostic system is that it is adaptable to current production knock sensor systems. Another advantage of the present invention is that it utilizes the reciprocal electromechanical properties of ceramic/piezoelectric resonators.

Other objects, features and advantages of the present invention will be readily appreciated as the same becomes better understood after reading the following description taken in conjunction with the accompanying drawings.

DESCRIPTION OF THE PREFERRED EMBODIMENT(S)

Figure 1:
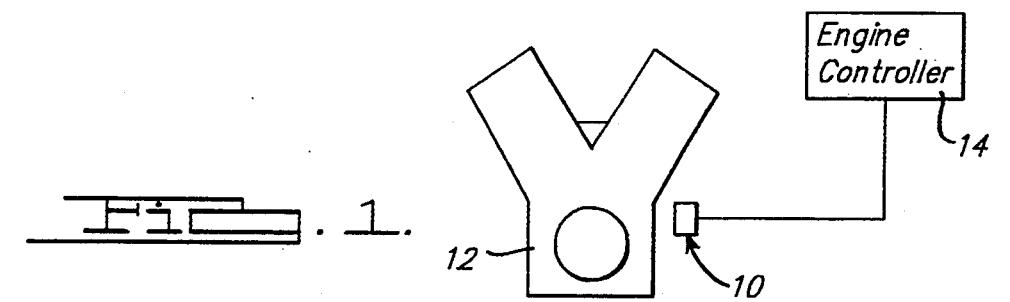
FIG. 1 is a schematic of a knock sensor system illustrated in operational relationship with an engine and engine controller.
Figure 2:
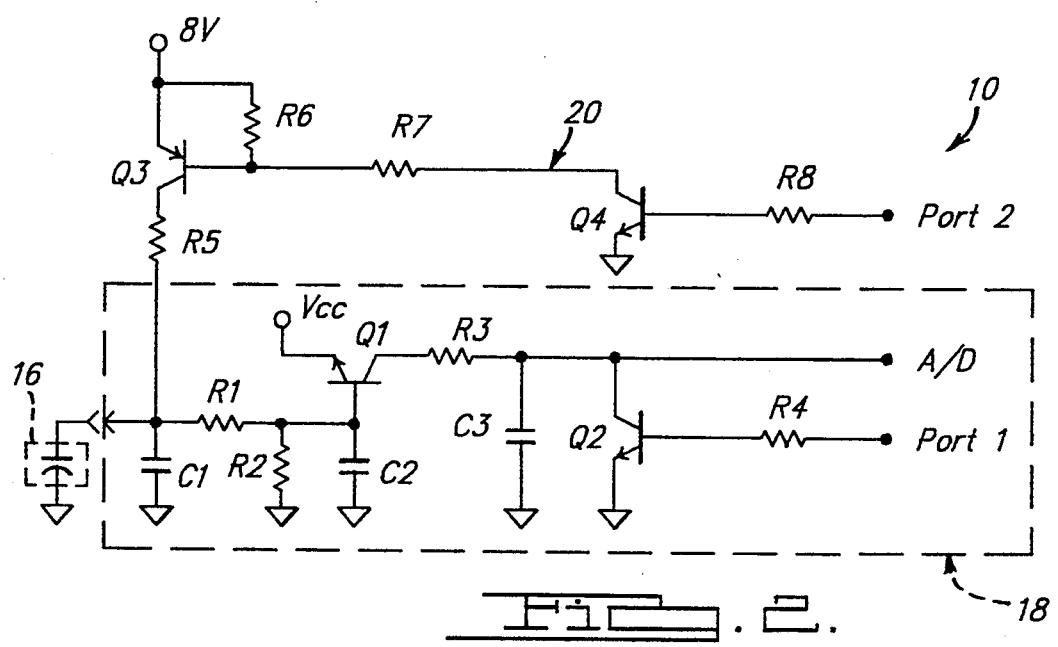
FIG. 2 is a circuit schematic of the knock sensor diagnostic system, according to the present invention, illustrated in operational relationship with the knock sensor system of FIG. 1.

Referring to FIGS. 1 and 2, a knock sensor system 10 is illustrated in operational relationship with an engine 12 such as an internal combustion engine and an engine controller 14. The knock sensor system 10 includes a knock sensor 16 connected to a knock sensor circuit, generally indicated at 18, to detect knock of the engine 12 which is communicated to and controlled by the engine controller 14. Preferably, the knock sensor 16 is a piezoelectric narrow band knock sensor which is conventional and known in the art. It should be appreciated that other suitable resonant frequency knock sensors may be used.

As illustrated in FIG. 2, the knock sensor circuit 18 includes a noise filter with load circuit connected to the knock sensor 16. The noise filter with load circuit includes a capacitor C1 which is connected to resistor R1 and ground,. The noise filter with load circuit also includes a resistor R2 connected to resistor R1 and ground. The noise filter with load circuit further includes a capacitor C2 connected to resistor R2 and ground. The noise filter with load circuit removes any unnecessary noise which is emanating from the knock sensor 16 in order to get a clear signal therefrom.

The knock sensor circuit 18 also includes a peak detector connected to the noise filter with load circuit. The peak detector includes a transistor Q1 which is connected to a voltage source Vcc. The base of transistor Q1 is connected to the capacitor C2 of the noise filter with load circuit. The collector of transistor Q1 is connected to a resistor R3 which, in turn, is connected to a capacitor C3 connected to a common ground. The other end of the peak detector is connected to an analog to digital (A/D) input of the engine controller 14. When the knock sensor 16 is mechanically excited, the peak detector detects the maximum amplitude of the signal from the knock sensor 16 and holds that signal constant at the A/D input of the engine controller 14 until a reset signal is received.

The knock sensor circuit 18 further includes a peak detector reset circuit interconnecting the peak detector and the engine controller 14. The peak detector reset circuit includes a transistor Q2 which has its collector connected to the A/D input and its base connected to a resistor R4. The resistor R4 is also connected to a port PORT 1 of the engine controller 14. The peak detector reset circuit is controlled by the engine controller 14 and releases the peak detector and allows it to detect the maximum amplitude of the signal from the knock sensor 16.

A knock sensor diagnostic circuit, generally indicated at 20 and according to the present invention, is illustrated in operational relationship with the knock sensor circuit 18. The diagnostic circuit 20 includes an active pull up driver interconnecting the knock sensor circuit 18 and a port PORT 2 of the engine controller 14. The diagnostic circuit 20 includes a first resistor R5 connected to the capacitor C1 of the knock sensor circuit 18. The resistor R5 is also connected to a collector of a transistor Q3. The transistor Q3 has a resistor R6 connected across its base and emitter. The transistor Q3 has its emitter connected to a power source which, for example, has a value of eight (8) volts. It should be appreciated that the power source may have different voltage levels.

The knock sensor diagnostic circuit 20 also includes a resistor R7 connected from resistor R6 to a collector of a transistor Q4. The base of the transistor Q4 is then connected to a resistor R8 which, in turn, is connected to PORT 2 of the engine controller 14. The emitter of the transistor Q4 is connected to a common ground. It should be appreciated that the active pull-up driver is connected to a programmable frequency generating output port, shown as PORT 2, of the engine controller 14 in order to control the pull-up driver.

Figure 4:
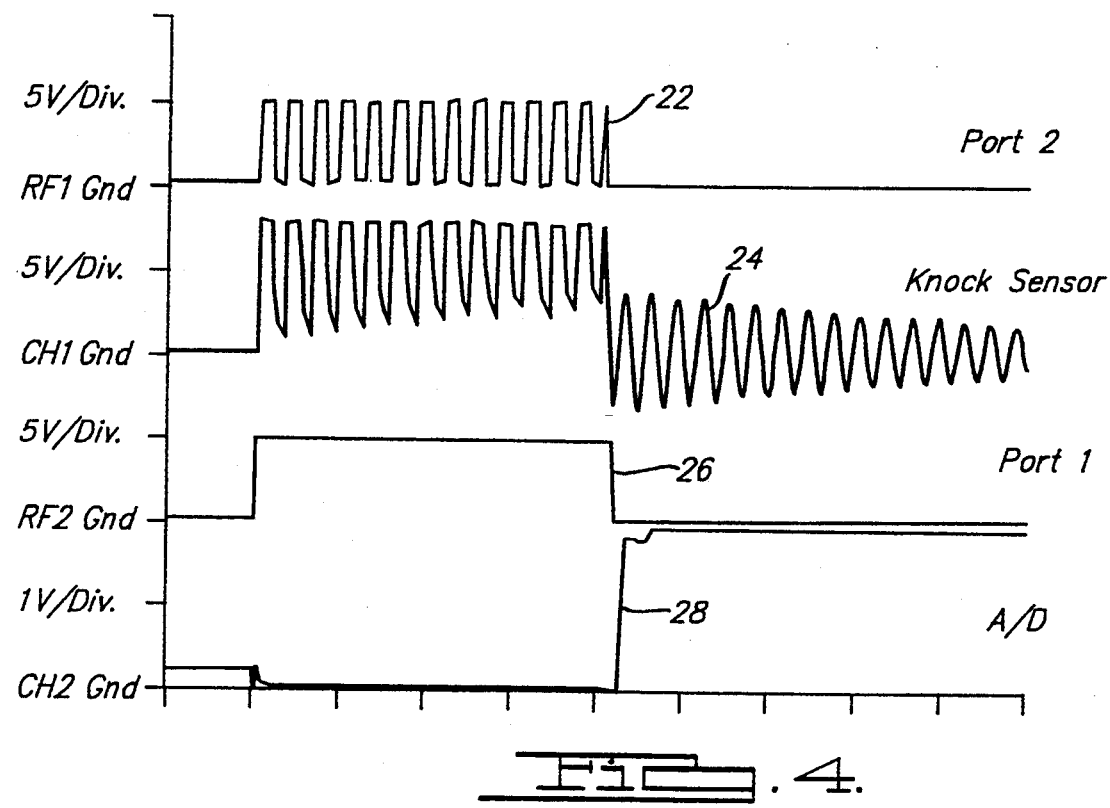
FIG. 4 is a graph illustrating signals generated from the circuit schematic of FIG. 2 with a working knock sensor.
Figure 5:
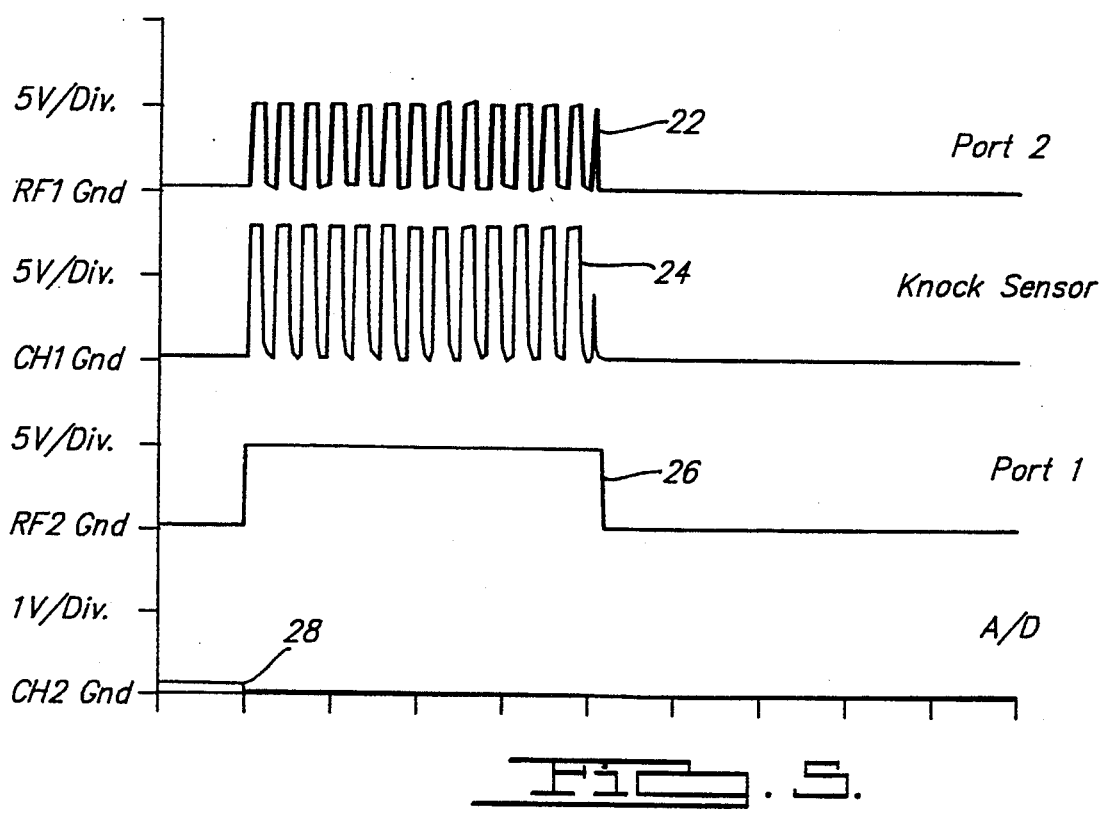
FIG. 5 is a graph illustrating signals generated from the circuit schematic of FIG. 2 without a working knock sensor.

During normal operation of the knock sensor system 10, PORT 2 is in a low state which, in turn, causes the transistors Q3 and Q4 to remain in an OFF state. As a result, the knock sensor diagnostic circuit 20 does not interfere with the operation of the knock sensor circuit 18. However, when the knock sensor system 10 is to be diagnosed, PORT 2 begins to emit a signal 22 at a frequency that matches the predetermined resonant frequency of the knock sensor 16 as illustrated in FIGS. 4 and 5. At the same time PORT 2 is sending the appropriate signal, PORT 1 of the engine controller 14 is set high which will put transistor Q1 in the ON state and hold the peak detector in reset. While the above two events are occurring on PORT 1 and PORT 2, the knock sensor 16 is receiving pulses from the power source, in our example, an 8 V power source, through transistor Q3 and resistor R5. The pulses are sent at a frequency which match the resonant frequency of the knock sensor 16. Hence, the knock sensor 16 starts to vibrate with an increasing amplitude signal 24 as illustrated in FIG. 4.

After a short period of time, in our example 2 milliseconds (msec.), PORT 2 will stop sending its signal 22 and be put in a low state. Then, a short period later, in our example 50 μsec., PORT 1 has a signal 26 which is forced to a low state as illustrated in FIG. 4. When PORT 1 is forced low, the peak detector reset circuit will be released. Then, the peak detector detects the maximum amplitude of the signal 24 from the knock sensor 16 and holds that value approximately constant at the A/D input of the engine controller 14 until the next reset signal is received.

The engine controller 14 then will read the A/D input and compare that value with a predetermined lower threshold value. If the knock sensor 16 is connected to the knock sensor system 10 and the PORT 2 square wave switching frequency matches the resonant frequency of the knock sensor 16, an A/D signal 28 will exceed the lower threshold, in our example 1 Volt, as illustrated in FIG. 4. This illustrates that the knock sensor 16 was installed and operating correctly. However, if the knock sensor 16 is not connected to the knock sensor system 10, the signal 24 from the knock sensor 16 will be shorted to ground or in an open state, or if the PORT 2 square wave switching frequency will not match the resonant frequency of the knock sensor 16, the A/D signal 28 will be relatively low as illustrated in FIG. 5, in our example less than 100 m volts. It should be appreciated that FIG. 5 illustrates that the knock sensor 16 was either not installed or not operating or working correctly.

Figure 3:
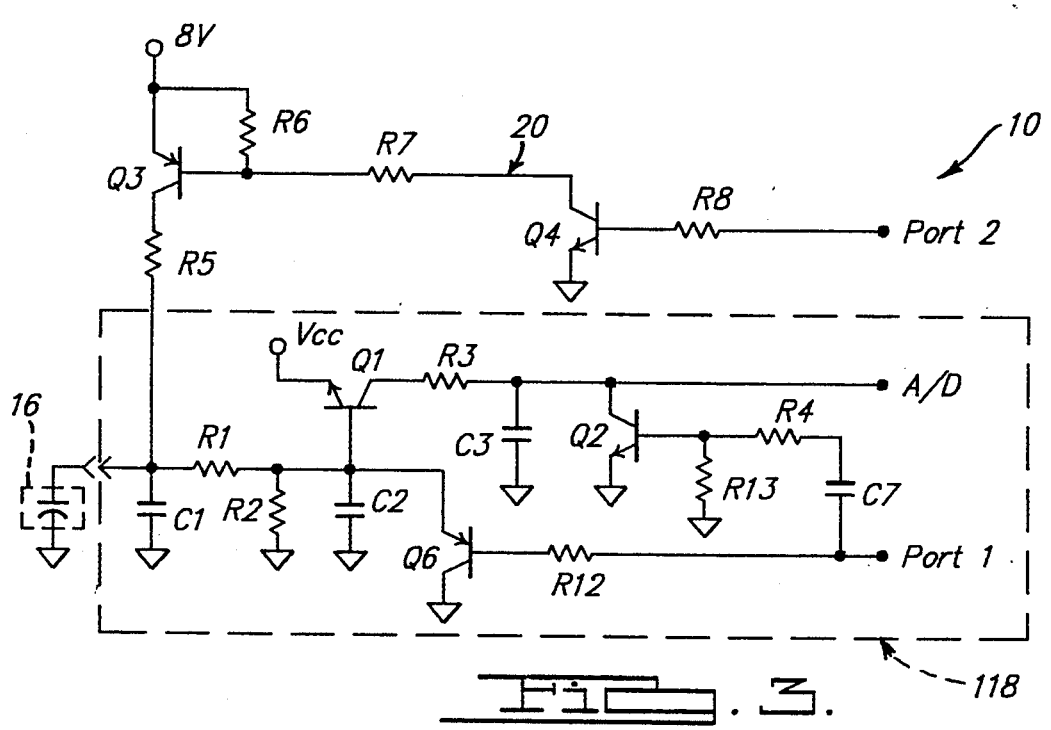
FIG. 3 is a circuit schematic of the knock sensor diagnostic system of FIG. 2 illustrated in operational relationship with an alternate embodiment of the knock sensor system of FIGS. 1 and 2.

Referring to FIG. 3, an alternate embodiment 118 of the knock sensor circuit 18 is shown. Like parts of the knock sensor circuit 18 have like reference characters. The knock sensor circuit 118 has a knock window circuit added. The knock window circuit includes a transistor Q6 connected to the capacitor C2 via the emitter. The base of the transistor Q6 is then connected to a resistor R12 which is also connected to PORT 1 of the engine controller 14. The knock window circuit enables the input at the peak detector to be held in a low state for a predetermined period of time. The peak detector reset circuit also includes a resistor R13 connected to the base of the transistor Q2 and ground. The resistor R13 is also connected to the resistor R4 which, in turn, is connected to a capacitor C7. The capacitor C7 is then connected to PORT 1 of the engine controller 14.

Figure 6:
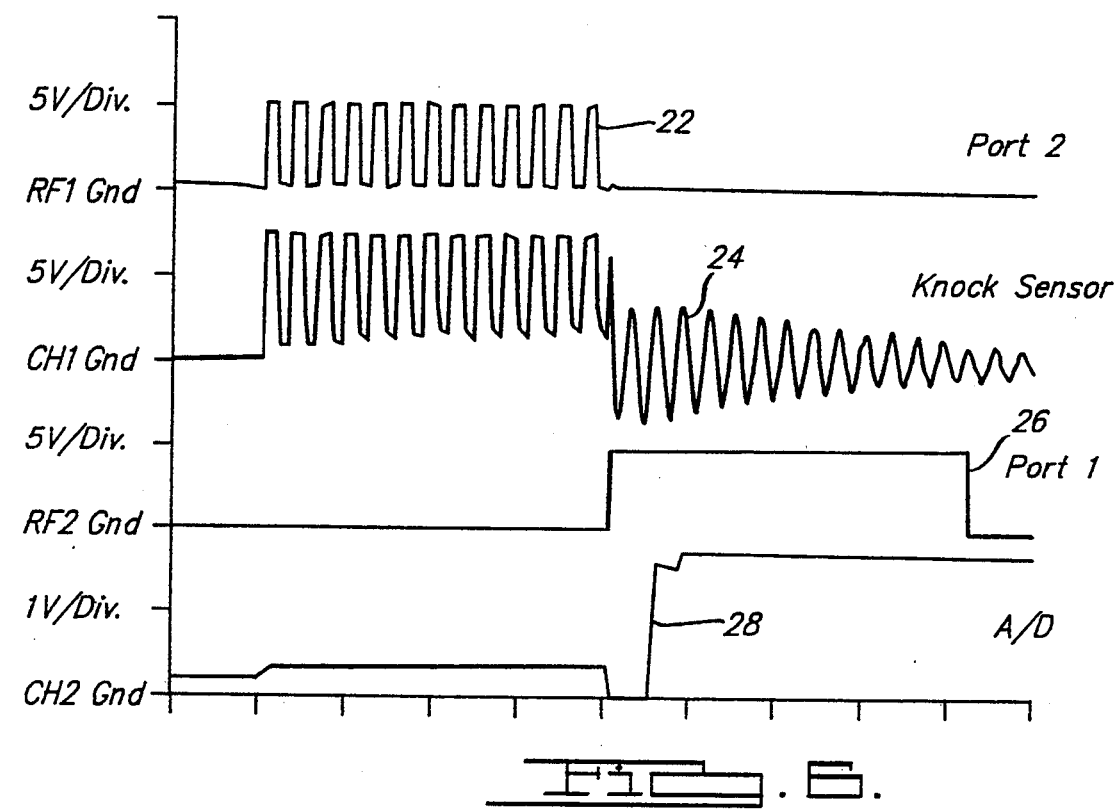
FIG. 6 is a graph illustrating signals generated from the circuit schematic of FIG. 3 with a working knock sensor.
Figure 7:
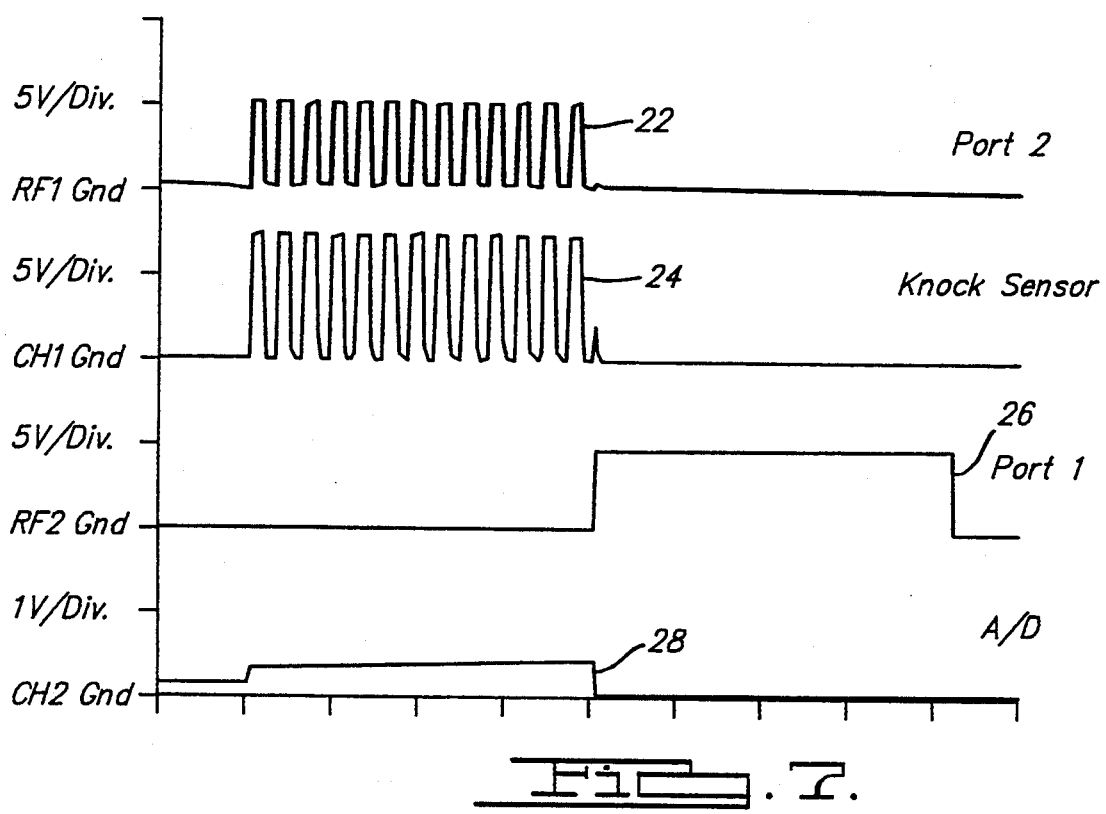
FIG. 7 is a graph illustrating signals generated from the circuit schematic of FIG. 3 without a working knock sensor.

During normal operation of the knock sensor system 10, PORT 2 is in a low state which, in turn, causes transistors Q3 and Q4 to remain in an OFF state. As a result, the knock sensor diagnostic circuit 20 does not interfere with the operation of the knock sensor circuit 118. However, when the knock sensor system 10 is to be diagnosed, PORT 2 begins to emit a signal 22 at a frequency that matches the predetermined resonant frequency of the knock sensor 16 as illustrated in FIGS. 6 and 7. At the same time PORT 2 is sending the appropriate signal, PORT 1 of the engine controller 14 is forced in a low state, which will put transistor Q6 into the ON state, which in turn, will hold the input to the peak detector low. During this time, the knock sensor 16 receives pulses from the power supply, in our example an 8 volt supply, through transistor Q3 and resistor R6 at a frequency which matches the resonant frequency of the knock sensor 16. Hence, the knock sensor 16 starts to vibrate with an increasing amplitude signal 24 as illustrated in FIG. 6.

After a short period of time, in our example 2 msec., PORT 2 will stop sending its signal 22 and be put in a low state. At the same time, PORT 1 is set to a high state which forces the peak detector to reset for a predetermined number of microseconds. The peak detector reset circuit will then execute its sequence, after which the peak detector will be able to detect the maximum amplitude of the signal 24 from the knock sensor 16. The peak detector holds the value of the maximum amplitude of the signal 24 from the knock sensor 16 approximately constant at the A/D input of the engine controller 14 until the next reset sequence is performed.

The engine-controller 14 will then read the A/D input and compare that value with a predetermined lower threshold value. If the knock sensor 16 is connected to the knock sensor system 10 and the Port 2 square wave switching frequency matches the resonant frequency of the knock sensor 16, the A/D signal 28 will exceed the lower threshold, in our example 1 volt, as illustrated in FIG. 6. Thus, if a knock sensor 16 is present and working correctly, the A/D input signal 28 will have a value greater than the predetermined lower threshold. However, if the knock sensor 16 is not connected to the knock sensor system 10, or the knock sensor 16 is shorted to ground or in an open state, or if the PORT 2 square wave switching frequency does not match the resonant frequency of the knock sensor 16, the A/D signal 28 will be relatively low, in our example less than 100 m volts, as illustrated in FIG. 7. Thus, the A/D signal 28 is lower than the predetermined minimum value which indicates that the knock sensor 16 is not operating or working correctly.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A knock sensor system for detecting knock in an engine, said knock sensor system comprising:
   a knock sensor operatively connected to an engine;
   a knock sensor circuit connected to said knock sensor to detect knock of the engine;
   an engine controller connected to said knock sensor circuit to communicate with and control said knock sensor circuit; and
   a diagnostic circuit having an active pull-up driver interconnecting said knock sensor circuit and said engine controller for diagnosing said knock sensor circuit to determine if said knock sensor is installed and operating correctly.

2. A knock sensor system as set forth in claim 1 wherein said diagnostic circuit comprises; a first resistor, a second resistor, a third resistor, a fourth resistor, a first transistor, and a second transistor to act as the active pull up driver and generate a required wave signal for diagnostic testing.

3. A knock sensor system as set forth in claim 1 wherein said knock sensor circuit comprises; noise filter means for removing electrical noise from the signal from said knock sensor, peak detector means for determining when said knock sensor reaches its peak amplitude, and reset circuit means for use in resetting said peak detector means.

4. A knock sensor system as set forth in claim 3 wherein said noise filter comprises; a first capacitor, a first resistor, a second resistor, and a second capacitor for removing any excess noise which exceeds a predetermined value.

5. A knock sensor system as set forth in claim 3 wherein said peak detector means comprises; a first transistor, a first resistor, and a first capacitor for sensing an analog/digital input of the controller.

6. A knock sensor system as set forth in claim 3 wherein said reset circuit comprises; a first transistor, a first capacitor, a first resistor and a second resistor for forcing said peak detector means to reset for a predetermined time value.

7. A knock sensor system as set forth in claim 3 wherein said knock sensor circuit further includes window circuit means for maintaining the input to said peak detector means at a low state.

8. A knock sensor system as set forth in claim 7 wherein said window circuit comprises; a first transistor and a first resistor for holding the input to the said peak detector means at a predetermined value.

9. A knock sensor system for detecting knock in an engine, said knock sensor system comprising:
   a knock sensor operatively connected to an engine;
   a knock sensor circuit connected to said knock sensor to detect knock of the engine, said knock sensor circuit comprising noise filter means connected to said knock sensor for removing electrical noise from the signal from said knock sensor, peak detector means connected to said noise filter means for determining when said knock sensor reaches its peak amplitude, and reset circuit means connected to said peak detector means for use in resetting said peak detector means;
   an engine controller connected to said reset circuit means of said knock sensor circuit to communicate with and control said knock sensor circuit; and
   a diagnostic circuit having an active pull-up driver interconnecting said knock sensor circuit and said engine controller for diagnosing said knock sensor circuit to determine whether said knock sensor is installed and operating correctly.

10. A knock sensor system as set forth in claim 9 wherein said diagnostic circuit comprises a first resistor, a second resistor, a third resistor, a fourth resistor, a first transistor, and a second transistor to act as the active pull up driver and generate a required wave signal for diagnostic testing.

11. A knock sensor system as set forth in claim 10 wherein said noise filter comprises; a first capacitor, a first resistor, a second resistor, and a second capacitor for removing any excess noise which exceeds a predetermined value.

12. A knock sensor system as set forth in claim 11 wherein said peak detector means comprises; a first transistor, a first resistor, and a first capacitor for sensing an analog/digital input of the controller.

13. A knock sensor system as set forth in claim 12 wherein said reset circuit comprises; a first transistor, a first capacitor, a first resistor and a second resistor for forcing the said peak detector means to reset for a predetermined time value.

14. A knock sensor system as set forth in claim 13 wherein said knock sensor circuit further includes window circuit means for maintaining the input to said peak detector means at a low state.

15. A knock sensor system as set forth in claim 14 wherein said window circuit comprises; a first transistor and a first resistor 1 for holding the input to the said peak detector means at a predetermined value.

* * * * *